United States Patent
Oetting

(10) Patent No.: US 11,191,005 B2
(45) Date of Patent: Nov. 30, 2021

(54) CYBER CONTROL PLANE FOR UNIVERSAL PHYSICAL SPACE

(71) Applicant: AT&T Intellectual Property I, L.P., Atlanta, GA (US)

(72) Inventor: John Oetting, Zionsville, PA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/425,594

(22) Filed: May 29, 2019

(65) Prior Publication Data

US 2020/0383034 A1     Dec. 3, 2020

(51) Int. Cl.
*H04W 48/04* (2009.01)
*H04W 4/021* (2018.01)

(52) U.S. Cl.
CPC ........... *H04W 48/04* (2013.01); *H04W 4/021* (2013.01)

(58) Field of Classification Search
CPC ..... H04W 48/04; H04W 48/08; H04W 48/00; G06Q 30/0267; H04L 12/141; H04L 63/20; H04L 41/28
USPC ........................................................ 709/225
See application file for complete search history.

(56) References Cited

U.S. PATENT DOCUMENTS

| 6,295,633 | B1 * | 9/2001 | Murakawa | ............ | G06F 30/392 716/124 |
| 8,150,621 | B1 | 4/2012 | Phillips et al. | | |
| 8,452,448 | B2 | 5/2013 | Pack et al. | | |
| 8,467,991 | B2 * | 6/2013 | Khosravy | ........... | G06F 3/04883 702/153 |
| 8,505,086 | B2 | 8/2013 | Norman et al. | | |
| 8,849,483 | B2 | 9/2014 | Kuwata et al. | | |
| 9,069,794 | B1 * | 6/2015 | Bandukwala | ........... | G06F 16/58 |
| 9,098,866 | B1 * | 8/2015 | Gurin | ................. | G06Q 30/0269 |
| 9,283,674 | B2 | 3/2016 | Hoffman et al. | | |
| 9,296,101 | B2 | 3/2016 | Laurent et al. | | |
| 9,317,036 | B2 | 4/2016 | Wang et al. | | |
| 9,413,784 | B2 | 8/2016 | Kohno et al. | | |

(Continued)

FOREIGN PATENT DOCUMENTS

| EP | 2269884 | 3/2013 |
| JP | 2007237873 | 9/2007 |

(Continued)

OTHER PUBLICATIONS

Bernardin et al., "Estimating the Cell Radius from Signal Strength Measurements", 2002 (Year: 2002).*

(Continued)

*Primary Examiner* — Ondrej C Vostal
(74) *Attorney, Agent, or Firm* — Amin, Turocy & Watson, LLP

(57) ABSTRACT

A cyber control plane for universal physical space is provided. A method can include establishing, by a device comprising a processor, control of a physical space within a geographic area by a control system for the physical space; in response to the establishing, generating, by the device, an authorization policy that regulates access to a wireless communication network within the physical space based on network access rules provided by the control system; and denying, by the device, access to resources of the wireless communication network within the physical space to a mobile application according to the authorization policy.

20 Claims, 13 Drawing Sheets

(56) References Cited

U.S. PATENT DOCUMENTS

| | | | |
|---|---|---|---|
| 9,602,965 B1* | 3/2017 | Kalis | H04W 4/02 |
| 9,618,934 B2 | 4/2017 | Deroos et al. | |
| 9,734,723 B1 | 8/2017 | Bruno et al. | |
| 9,776,327 B2 | 10/2017 | Pinter et al. | |
| 9,805,372 B2 | 10/2017 | Gong et al. | |
| 9,905,134 B2 | 2/2018 | Kube et al. | |
| 9,983,553 B2 | 5/2018 | Nishi | |
| 10,095,230 B1 | 10/2018 | Hardin | |
| 10,158,671 B2 | 12/2018 | Poornachandran et al. | |
| 10,462,149 B2* | 10/2019 | Trigger | H04L 63/102 |
| 2003/0033195 A1* | 2/2003 | Bruce | G06Q 30/0205 |
| | | | 705/7.31 |
| 2005/0261004 A1* | 11/2005 | Dietrich | G01S 5/02 |
| | | | 455/456.2 |
| 2011/0190933 A1 | 8/2011 | Shein et al. | |
| 2012/0069131 A1* | 3/2012 | Abelow | G06Q 10/067 |
| | | | 348/14.01 |
| 2012/0246003 A1* | 9/2012 | Hart | G06Q 30/0267 |
| | | | 705/14.57 |
| 2013/0012231 A1* | 1/2013 | Hall | H04W 4/021 |
| | | | 455/456.2 |
| 2013/0084884 A1* | 4/2013 | Teyeb | H04W 48/04 |
| | | | 455/456.1 |
| 2013/0135180 A1* | 5/2013 | McCulloch | G06Q 10/10 |
| | | | 345/8 |
| 2013/0212065 A1* | 8/2013 | Rahnama | G06F 16/24575 |
| | | | 707/609 |
| 2014/0018979 A1 | 1/2014 | Goossen et al. | |
| 2014/0099880 A1* | 4/2014 | Thistoll | H04L 12/1845 |
| | | | 455/3.06 |
| 2015/0120881 A1* | 4/2015 | Garcia Manchado | H04W 4/21 |
| | | | 709/219 |
| 2015/0128089 A1* | 5/2015 | Johnson | G06F 16/29 |
| | | | 715/800 |
| 2015/0213496 A1* | 7/2015 | McDevitt | G06Q 30/0277 |
| | | | 705/14.58 |
| 2016/0031081 A1* | 2/2016 | Johnson | H04L 9/0866 |
| | | | 700/250 |
| 2016/0110972 A1* | 4/2016 | Renkis | G08B 13/19656 |
| | | | 709/205 |
| 2016/0140851 A1 | 5/2016 | Levy et al. | |
| 2016/0373499 A1* | 12/2016 | Wagner | G06Q 50/01 |
| 2017/0013016 A1* | 1/2017 | Wong | H04L 63/20 |
| 2017/0208632 A1* | 7/2017 | Gunasekara | H04L 12/141 |
| 2017/0237804 A1* | 8/2017 | Baughman | H04L 67/10 |
| | | | 709/201 |
| 2017/0269586 A1* | 9/2017 | D'Andrea | G01S 1/00 |
| 2017/0318519 A1* | 11/2017 | Belz | H04W 40/244 |
| 2018/0096609 A1 | 4/2018 | De et al. | |
| 2018/0234351 A1* | 8/2018 | Amento | G06F 9/00 |
| 2018/0302403 A1* | 10/2018 | Souders | H04L 63/107 |
| 2018/0307251 A1 | 10/2018 | Harvey | |
| 2018/0311573 A1 | 11/2018 | Pickover et al. | |
| 2019/0011912 A1 | 1/2019 | Lockwood et al. | |
| 2019/0043368 A1 | 2/2019 | Priest | |
| 2019/0188668 A1* | 6/2019 | Braga | G07F 17/40 |
| 2019/0205486 A1* | 7/2019 | Santarone | H04W 4/029 |
| 2019/0253952 A1* | 8/2019 | Kumar | H04W 68/02 |
| 2019/0313361 A1* | 10/2019 | Blaha, Jr. | H04W 64/00 |
| 2019/0362572 A1* | 11/2019 | Amuduri | H04W 12/00503 |
| 2020/0154271 A1* | 5/2020 | Rane | H04L 9/0894 |
| 2020/0396706 A1* | 12/2020 | Sandgren | H04W 56/003 |

FOREIGN PATENT DOCUMENTS

| | | |
|---|---|---|
| WO | 2016154942 | 10/2016 |
| WO | 2018161287 | 9/2018 |

OTHER PUBLICATIONS

Merriam-Webster, "media", 2021 (Year: 2021).*
Science Direct, "Terrestrial positioning", 2021 (Year: 2021).*
Wikipedia, "Cloud computing", 2021 (Year: 2021).*
Wikipedia, "Point cloud", 2021 (Year: 2021).*
Dictionary, "region", 2021 (Year: 2021).*
Merriam-Webster, "region", 2021 (Year: 2021).*
Hadzic et al., "Edge Computing in the ePC—A Reality Check", 2017 (Year: 2017).*
Jin et al., "CAC: Context Adaptive Clustering for Efficient Data Aggregation in Wireless Sensor Networks", 2006 (Year: 2006).*
Johnson et al., "Law and Borders: The Rise of Law in Cyberspace", 1996 (Year: 1996).*
Merriam-Webster, "access point", 2021 (Year: 2021).*
Merriam-Webster, "within", 2021 (Year: 2021).*
Naguib et al., "Mobile policy enforcement based on location", JP2016-523028A, 2016 (Year: 2016).*
Rinaldi et al., "Identifying, Understanding, and Analyzing Critical Infrastructure Interdependencies", 2001 (Year: 2001).*
Stuart et al., "The geography of opportunity: spatial heterogeneity in founding rates and the performance of biotechnology firms", 2003 (Year: 2003).*
Kress-Gazit, et al. "Correct, reactive, high-level robot control" IEEE Robotics & Automation Magazine 18.3 (2011): 9 pages.
Tunstel, et al. "Fuzzy behavior hierarchies for multi-robot control" International Journal of Intelligent Systems 17.5 (2002): 449-470.
Dresner, et al. "Multiagent traffic management: A reservation-based intersection control mechanism" Proceedings of the Third International Joint Conference on Autonomous Agents and Multiagent Systems—vol. 2. IEEE Computer Society, Jul. 2004. 8 pages.
Cavoukian, Ann. "Privacy and drones: Unmanned aerial vehicles". Ontario: Information and Privacy Commissioner of Ontario, Canada, Aug. 2012. 30 pages.
Finn, et al. "Unmanned aircraft systems: Surveillance, ethics and privacy in civil applications" Computer Law & Security Review 28.2 (2012): 184-194.

* cited by examiner

CYBER CONTROL PLANE FOR UNIVERSAL PHYSICAL SPACE

TECHNICAL FIELD

The present disclosure relates to wireless communication systems, and, in particular, to techniques for managing access to resources of a wireless communication system.

BACKGROUND

Advancements in computing and network technology have resulted in the proliferation of network-enabled automated activities ("cyber-activities"). Such activities can include augmented reality (AR) and mixed reality (MR) applications, which can render virtual elements onto real-world scenes to create rich, immersive experiences. Cyber-activities can also be associated with applications that power autonomous robots such as driverless automobiles, delivery robots, service robots (e.g., mowing or cleaning robots, security robots, etc.), etc. With respect to these and/or other cyber-activities, it is desirable to implement techniques by which an operator of a physical space can regulate cyber-activities occurring within that space.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include establishing, by a device comprising a processor, control of a physical space within a geographic area by a control system for the physical space. In response to the establishing, the method can further include generating, by the device, an authorization policy that regulates access to a wireless communication network within the physical space based on network access rules provided by the control system. The method can additionally include denying, by the device, access to resources of the wireless communication network within the physical space to a mobile application according to the authorization policy.

In another aspect, a system as described herein can include a processor and a memory that stores executable instructions that, when executed by the processor, facilitate performance of operations. The operations can include initiating control of a physical space within a geographic area by a steward system for the physical space; in response to the initiating, defining an access control policy for a wireless communication network within the physical space based on network access rules provided by the steward system; and prohibiting access to resources of the wireless communication network within the physical space to a mobile application according to the access control policy.

In a further aspect, a machine-readable storage medium as described herein can include executable instructions that, when executed by a processor, facilitate performance of operations. The operations can include facilitating establishment of control of a physical location within a geographic area by a controlling entity; in response to the facilitating the establishment of control, defining a network access policy for a wireless communication network within the physical location based on rules provided by the controlling entity; and blocking access to communication network resources within the physical location to a mobile application according to the network access policy.

Figure 1:
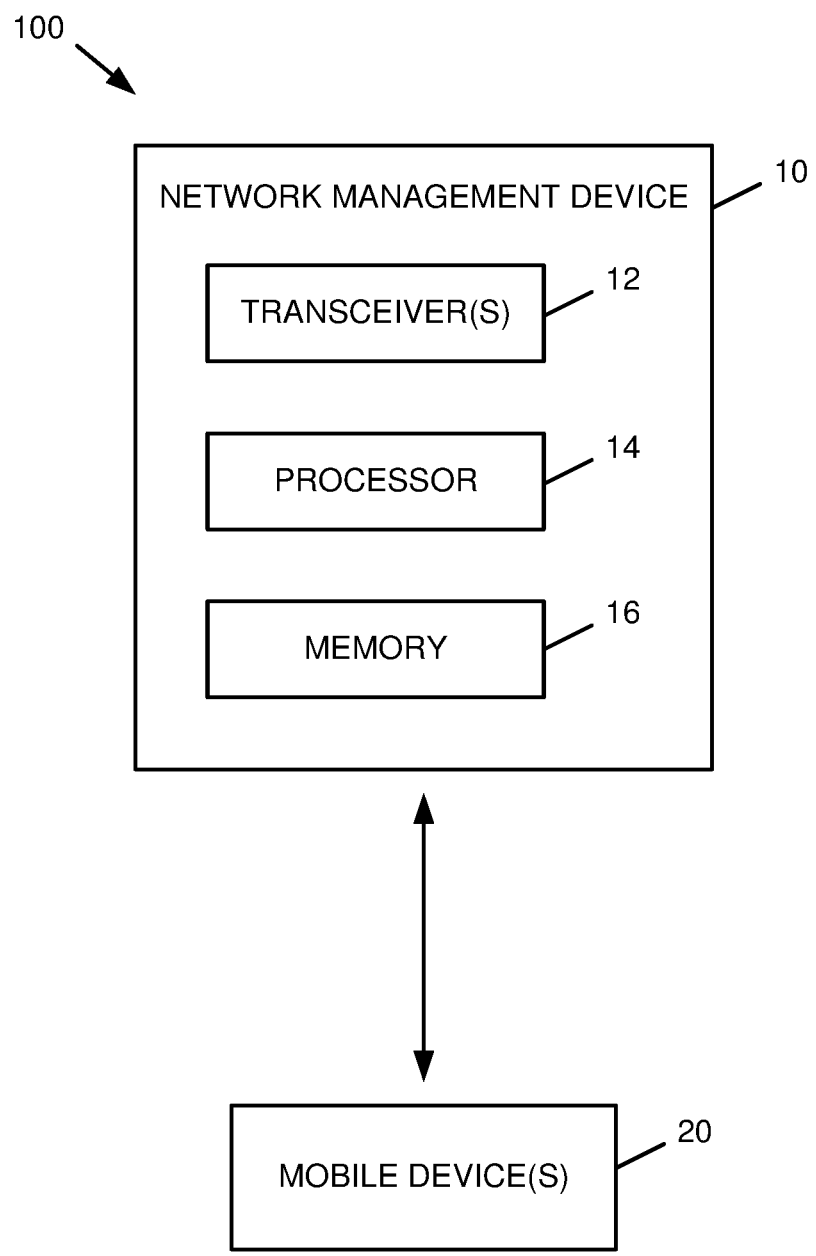
FIG. 1 is a block diagram of a system that facilitates a cyber control plane for universal physical space in accordance with various aspects described herein.

Referring first to FIG. 1, a system 100 that facilitates a cyber control plane for universal physical space in accordance with various aspects described herein is illustrated. System 100 as shown by FIG. 1 includes a network management device 10 that can communicate with one or more mobile devices 20. In an aspect, the network management device 10 can be a base station, an access point (AP), an Evolved Node B (eNB), and/or another device that provides communication service to the mobile devices 20. Also or alternatively, the network management device 10 can be implemented wholly or in part by one or more routers or relays, such as an edge router, that direct the flow of communication between one or more mobile devices 20 in an area and associated nearby network infrastructure. In still another example, the network management device 10 can be implemented by one or more network controllers and/or other devices that manage communication between devices of a wireless communication network. A separate controller implemented in this manner can reside on the same communication network as respective mobile devices 20 and/or corresponding base stations or on a different network (e.g., such that the controller can communicate with respective network devices via a separate system). Other implementations of the network management device 10 are also possible.

In another aspect, the mobile devices 20 can include any suitable devices that can communicate over a wireless communication network associated with the network management device 10. Such devices can include, but are not limited to, cellular phones, computing devices such as tablet or laptop computers, autonomous vehicles, automated service robots (e.g., mowing robots, delivery robots, etc.), unmanned aerial vehicles (UAVs, also commonly referred to as "drones"), etc. Also or alternatively, a mobile device 20 could be a device such as a modem, a mobile hotspot, or the like, that provides network connectivity to another device (e.g., a laptop or desktop computer, etc.) which itself can be fixed or mobile.

Collectively, the network management device 10 and the mobile device(s) 20 can form at least a portion of a wireless communication network. While only one network management device 10 and one mobile device 20 are illustrated in FIG. 1 for simplicity of illustration, it should be appreciated that a wireless communication network can include any number of mobile devices 20 and/or other devices such as the network management device 10, APs, etc. Additionally, it should be appreciated that a wireless communication network as defined in this manner can operate according to any suitable communication protocol or combination of protocols. For instance, the wireless communication network can be a cellular communication network according to one or more cellular communication protocols, a wireless local area network (WLAN) that utilizes Wi-Fi and/or other similar protocols, a wireless personal area network (WPAN) that utilizes Bluetooth and/or other similar protocols, etc.

The network management device 10 shown in system 100 can include one or more transceivers 12 that can communicate with (e.g., transmit messages to and/or receive messages from) the mobile device 20 and/or other devices in system 100. The transceiver 12 can include respective antennas and/or any other hardware or software components (e.g., an encoder/decoder, modulator/demodulator, etc.) that can be utilized to process signals for transmission and/or reception by the network management device 10 and/or associated network devices such as an AP.

In an aspect, the network management device 10 can further include a processor 14 and a memory 16, which can be utilized to facilitate various functions of the network management device 10. For instance, the memory 16 can include a non-transitory computer readable storage medium that contains computer executable instructions, and the processor 14 can execute instructions stored by the memory 16. For simplicity of explanation, various actions that can be performed via the processor 14 and the memory 16 of the network management device 10 are shown and described below with respect to various logical components. In an aspect, the components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable.

In an aspect, the processor 14 and memory 16 can be utilized to establish control of a physical space (e.g., a building or a portion of a building, a defined area such as a park, etc.) within a geographic area by a control system for the physical space. The control system can, in turn, be operated by an owner of the physical space and/or another party with authority over the physical space. In response to establishing control of the physical space, the processor 14 and memory 16 can further be utilized to generate an authorization policy that regulates access to a wireless communication network within the physical space based on network access rules provided by the control system. Based on this authorization policy, the processor 14 and memory 16 can also be used to deny (prohibit, block, etc.) access to resources of the wireless communication network within the physical space to a mobile application.

By implementing various embodiments as described herein, various advantages can be realized that can improve the performance of a wireless communication network and/or respective devices in the network. These advantages can include, but are not limited to, the following. Network bandwidth usage efficiency in an area can be increased. Physical safety of mobile users in an area can be improved by, e.g., deterring collisions between users of different applications within the area. Performance of public safety, public utility, and/or other high-priority applications can be improved even in highly congested areas. Traffic control for autonomous devices in an area can be improved, thereby improving the efficiency of such devices (e.g., in terms of simplified collision avoidance, reduced movement distance, etc.) as well as the network(s) in which they operate. Other advantages are also possible.

Figure 2:
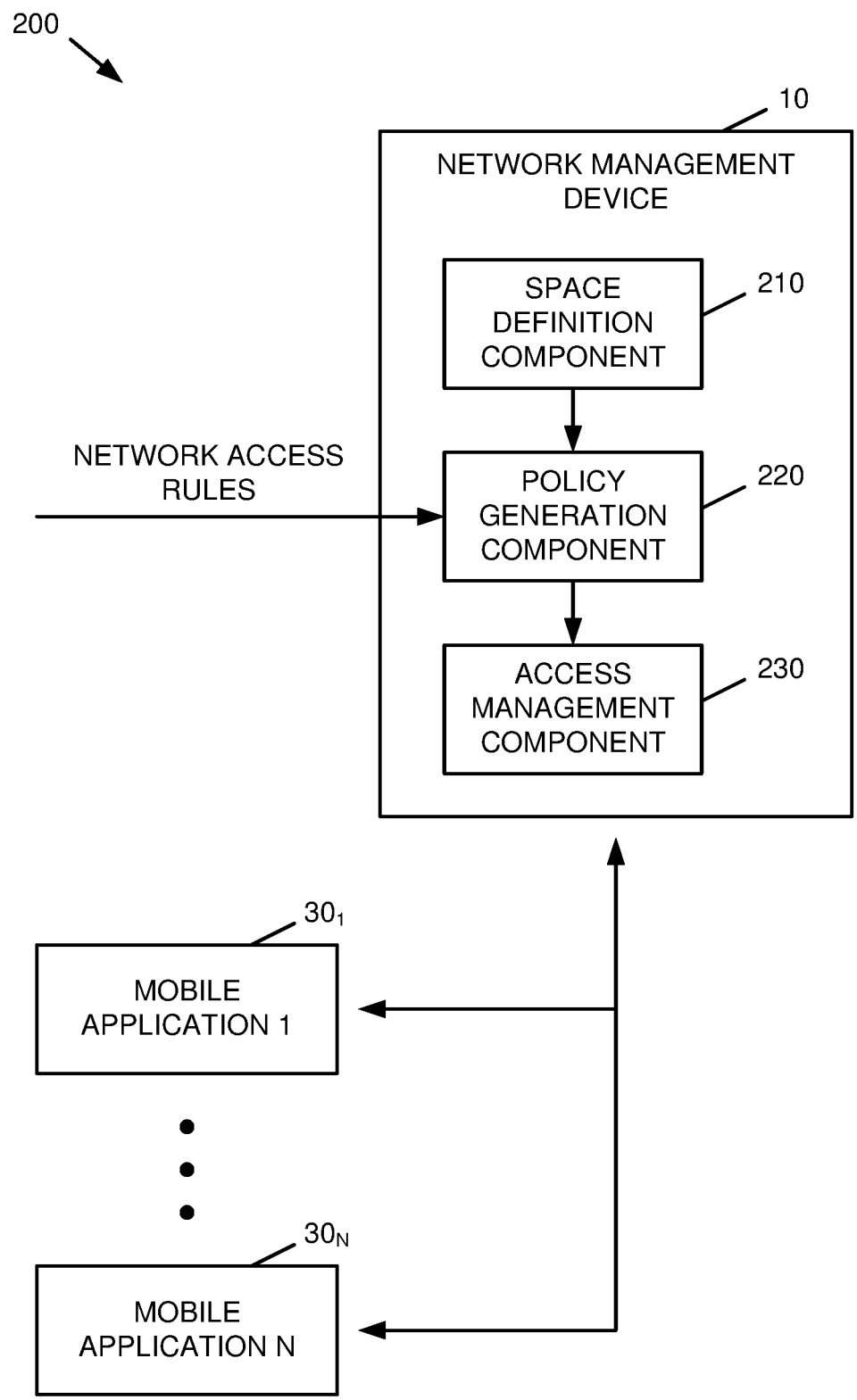
FIG. 2 is a block diagram of a system that facilitates wireless communication network access management within a defined physical space in accordance with various aspects described herein.

With reference now to FIG. 2, a block diagram of a system 200 that facilitates wireless communication network access management within a defined physical space in accordance with various aspects described herein is illustrated. Repetitive description of like elements employed in other embodiments described herein is omitted for sake of brevity. System 200 as shown in FIG. 2 includes a network management device 10 that can operate in a similar manner to that described above with respect to FIG. 1. As further shown in FIG. 2, the network management device 10 can communicate with one or more mobile applications 30, here a group of N mobile applications 30, via one or more communication networks. It should be appreciated that the numbering convention utilized for the mobile applications 30 in FIG. 2 is provided merely for clarity of illustration and is not intended to imply any specific number of mobile applications 30 in system 200. Rather, system 200 can include any suitable number of mobile applications 30, including one mobile application 30 or multiple mobile applications 30.

In an aspect, the network management device 10 in system 200 can provide a platform to bridge between a real-world area and a cyber-centric activity for any unit of outdoor or indoor space by authorizing and controlling use of the space across time. The network management device 10 can enable an owner and/or steward of a physical space to control the cyber-activities, e.g., implemented by respective mobile applications 30, that are supported or allowed in and/or around their space. For instance, mobile applications 30 that can be regulated by the network management device 10 can include local and/or remote augmented reality (AR) experiences or virtual venue visitation (VVV), service robot transit or activity (e.g., sidewalk/hallway package delivery, sweeping/mowing, etc.), unmanned aerial vehicle (UAV) flyover (e.g., for recreational and/or commercial use), autonomous vehicle LIDAR (Light Detection and Ranging) or photogrammetric mapping, etc.

As used herein, the term "augmented reality application" refers to any application that renders virtual objects onto a display of a real-world area. Accordingly, the term "augmented reality application" as used herein can refer both to traditional AR applications as well as mixed reality (MR) applications that anchor virtual objects to particular real-world locations. Additionally, similar concepts to those described herein for AR applications can also be used for virtual reality (VR) applications.

In an aspect, the network management device 10 as shown in system 200 can include a space definition component 210 that can delineate a physical space within a geographic area as well as establish control of that physical space by a control system, steward system, and/or another controlling entity of the physical space. The system and/or entity established by the space definition component 210 as having control over the physical space can, in turn, be operated by an owner of the physical space, a tenant of the physical space, and/or other parties having authority over activities occurring in the physical space. Subsequently, a system and/or entity having control over the physical space as established by the space definition component can provide one or more rules for regulating access to communication network resources within the physical space, e.g., as described below with respect to FIG. 3. These rules can then be utilized by a policy generation component 220 at the network management device 10 to generate an authorization policy for cyber-activities within the physical space in accordance with various aspects as described below.

In another aspect, the space definition component 210 can generate and/or otherwise utilize a point cloud, such as a two-dimensional or three-dimensional point cloud, to represent a geographic area associated with the network management device 10 and/or one or more communication networks associated with the network management device 10. Within this point cloud, the space definition component 210 can then delineate and/or otherwise define a given physical space as a section of the point cloud. The space definition component 210 can subsequently associate the physical space as defined within the point cloud with a control system and/or other controlling entity for the physical space to facilitate access management for that space.

In some embodiments, the point cloud for a given geographic area can be a central point cloud that is maintained by the network management device 10 and/or one or more other network elements and updated based on information and/or requests provided by respective mobile applications 30 in the area. Also or alternatively, the point cloud for a geographic area can be constructed and/or maintained by the network management devices based at least in part on local point clouds that are individually maintained by respective mobile applications 30, e.g., based on point cloud information received from the network management device 10. Other implementations are also possible.

Based on a designated physical space as defined by the space definition component 210 and an authorization policy as generated by the policy generation component 220, an access management component 230 at the network management device 10 can regulate access to network resources within the physical space by respective mobile applications according to one or more criteria. In doing so, owners and/or stewards of physical spaces, such as public, commercial, business and/or private parties, can be given capabilities to identify, schedule and control the dynamic relationship of cyber-centric activities related to their physical space. Additionally, controllers of a physical space can be given policies to address everyday rhythms, known recurring infrequent events, known and/or unknown unexpected events (e.g., local hazards, emergencies, swarm gatherings or "flash mobs," etc.). Policies as applied by the network management device 10 can be customizable to reflect jurisdictional regulatory differences, local cultural sensitives, business strategies, legal and/or regulatory requirements, or the like.

Various aspects described herein can provide control, planning and permissions for said unit of space for both physical usage of a space as well as cyber-centric usage. In an aspect, physical usage constraints for a physical space can be utilized for entities whose movement can be controlled (e.g., UAVs, service robotics, connected vehicles . . . ), while cyber-centric constraints can be utilized to manage relationships between physical and cyber-centric use of the space (e.g., in connection with AR and/or VVV applications that can occur in the same or adjacent areas, etc.). For instance, cyber-centric constraints that can be applied according to various aspects described herein could be utilized by various applications, such as AR applications, VVV applications, or the like, to indirectly control movement by influencing the behavior of those applications (e.g., by shifting or otherwise relocating virtual objects and/or other aspects of an application from one location to another and/or by other suitable means). Examples of applications that could influence movement in this manner can include gaming applications, performance experiences, or similar and/or other applications that are not required to be anchored in a specific place.

Figure 3:
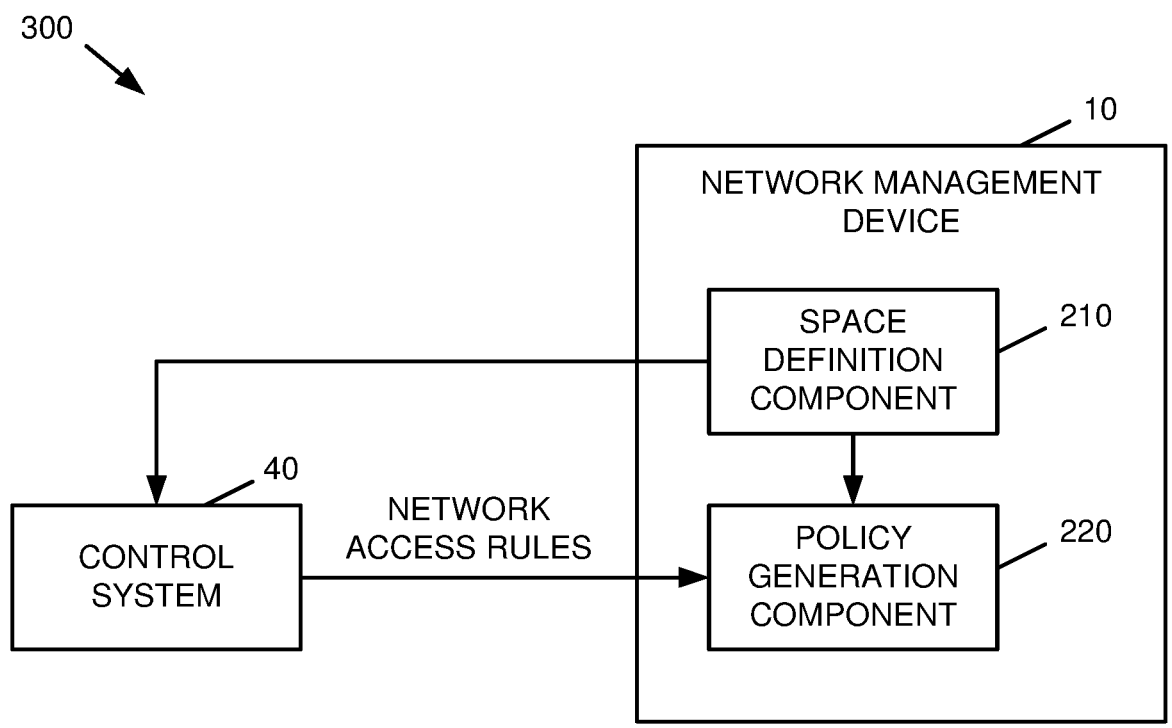
FIG. 3 is a block diagram of a system that facilitates definition of a network authorization policy for a physical space in accordance with various aspects described herein.

Referring now to FIG. 3, a block diagram of a system 300 that facilitates definition of a network authorization policy for a physical space in accordance with various aspects described herein is illustrated. Repetitive description of like elements employed in other embodiments described herein is omitted for sake of brevity. As shown by system 300, in response to a physical space and/or other area of authority being established (e.g., in a three-dimensional model or map of a geographic area) on behalf of its owner or controller, network access rules for the physical space can be provided to the network management device 10 via a control system (steward system, policy management system, etc.) 40. In an aspect, the control system 40 can be utilized by the owner or controller of the physical space, and/or one or more parties authorized by the owner or controller, to define an authorization policy for the space. The authorization policy, in turn, can define a set of authorized cyber-centric uses for the space. The authorization policy can include various parameters which can include, but are not limited to, the following:

1) AR experiences, autonomous robot control applications, and/or other cyber-centric experiences or uses
2) Users or user groups
3) Time (e.g., according to recurring and/or ad hoc schedules)
4) Physical space information, which can in some instances include a partitioning of an overall physical space
5) Obfuscation and/or blockage areas or objects
6) Other provided metadata Other parameters could also be used. The usage of these and/or other parameters in developing and enforcing an authorization policy are described in further detail below.

Figure 4:
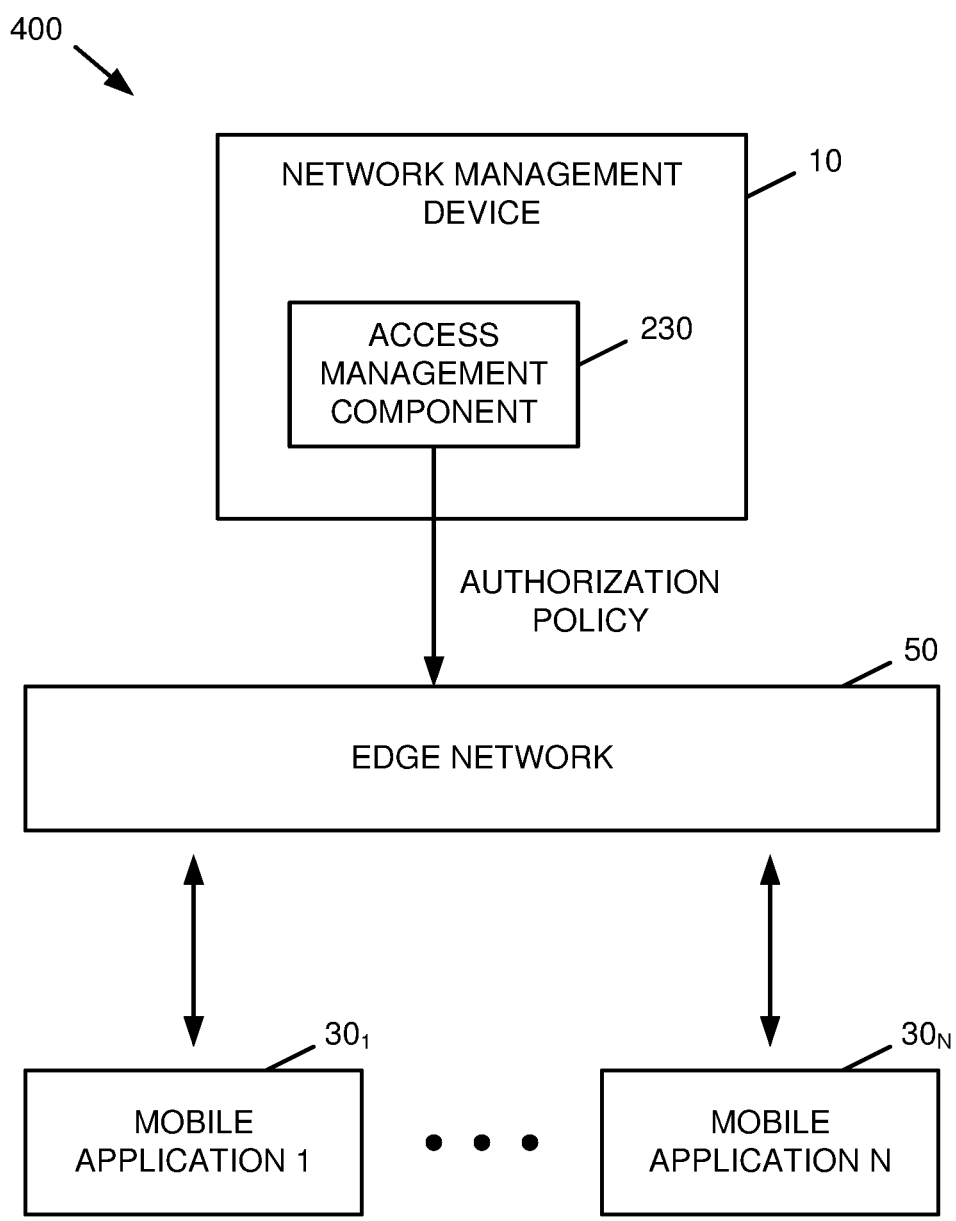
FIG. 4 is a block diagram of a system that facilitates regulating edge network access to mobile applications according to an authorization policy in accordance with various aspects described herein.

Turning next to FIG. 4, a block diagram of a system 400 that facilitates regulating edge network access to mobile applications according to an authorization policy in accordance with various aspects described herein is illustrated. Repetitive description of like elements employed in other embodiments described herein is omitted for sake of brevity. As shown in FIG. 4, system 400 includes a network management device 10 that utilizes an access management component 230 to regulate access to network resources via an authorization policy as described above. As further shown by FIG. 4, the authorization policy managed by the access management component 230 regulates access by respective mobile applications 30 (and/or mobile devices 20, not shown in FIG. 4, associated with the mobile applications 30) to resources of an edge network 50. The edge network 50 can include cell towers, local resource controllers, and/or other network devices deployed in close proximity to the area in which the respective mobile applications 30 operate.

In an aspect, since network usage associated with the mobile applications 30 can be predominantly local (e.g., in consumption or updating), the edge network 50 and/or elements thereof (e.g., an edge cloud implemented via the edge network 50) can be utilized to host runtime aspects of the network management device 10 and/or the mobile applications 30 due to data volume and latency. For instance, in the case of an AR application, communications between an AR application and a communication network can have latency associated with signal travel time and/or other factors, which can result in perceived delay associated with rendered virtual objects. This delay is commonly known as motion-to-photon latency due to its basis in the delay between motion of an object and visual perception of said motion. It is highly desirable to mitigate motion-to-photon latency (e.g., to no more than 20 ms), as high motion-to-photon latency can result in diminished user experience. To this end, use of the edge network 50 can reduce messaging latency, e.g., relative to communications between a mobile application 30 and a centralized (core) network apparatus.

In an aspect, the access management component 230 of the network management device 10 can regulate access to resources of the edge network 50 in order to provide solutions for various technical problems that can arise from cyber-centric activities occurring in a physical space. By way of example, the network management device 10 can be utilized to prevent unauthorized correlation of cyber to physical space. More particularly, the network management device 10 can restrict network access to mobile applications 30 that cause gaze obfuscation, create unauthorized advertising overlays, etc. For instance, a mall operator could configure the network management device 10 to restrict network access by mobile applications 30 that mask or distort branding, logos, advertisements, and/or other visual elements of the mall tenants in order to protect their commercial or other interests. Similarly, the network management device 10 can deny or otherwise restrict network access to mobile applications 30 that generate virtual elements that cover, block, or otherwise visually obfuscate designated points of interest. An authorization policy utilized in this manner can be static, or alternatively the policy can be dynamically altered based on factors such as sponsorship and/or advertising permissions, placement time and/or location, specific activities associated with a physical space, etc.

As another example, the access management component 230 of the network management device 10 can be utilized to prevent sensitive areas from inappropriate cyber-centric uses. For instance, the network management device 10 can be utilized to block some or all cyber-centric activities in order to ensure personal privacy in areas such as nurseries or locker rooms. As another example, an operator of a culturally sensitive area (e.g., a cemetery, memorial, house of worship, etc.) can block respective mobile applications 30 that are deemed inappropriate for that space. For instance, an operator of a historic memorial site could configure the network management device 10 to block all cyber-centric activities on the site except for officially approved historical experiences, mowing robots and/or other authorized maintenance robots, and/or other specifically allowed activities.

In a further example, the network management device 10 can be utilized to control uses of a public venue during a concert, exhibit, festival, or other special event. For instance, a party that reserves a space for an event can utilize the network management device 10 to restrict network access in the area to mobile applications 30 that are associated with and/or otherwise approved by the event, e.g., an official AR experience for a Shakespeare day at a park, etc. An event organizer can also utilize the network management device 10 to regulate access to the event space by service robots or other autonomous objects, e.g., by banning UAV flyover, restricting service robots that can access the event space to predetermined numbers, missions (e.g., delivery, groundskeeping, etc.), and/or types of robots, etc. Similarly, an operator of a theme park, a sports or concert venue, and/or other commercial entertainment venues can restrict network access to mobile applications 30 that facilitate unauthorized livestreaming, recording, etc., of protected intellectual property.

Figure 5:
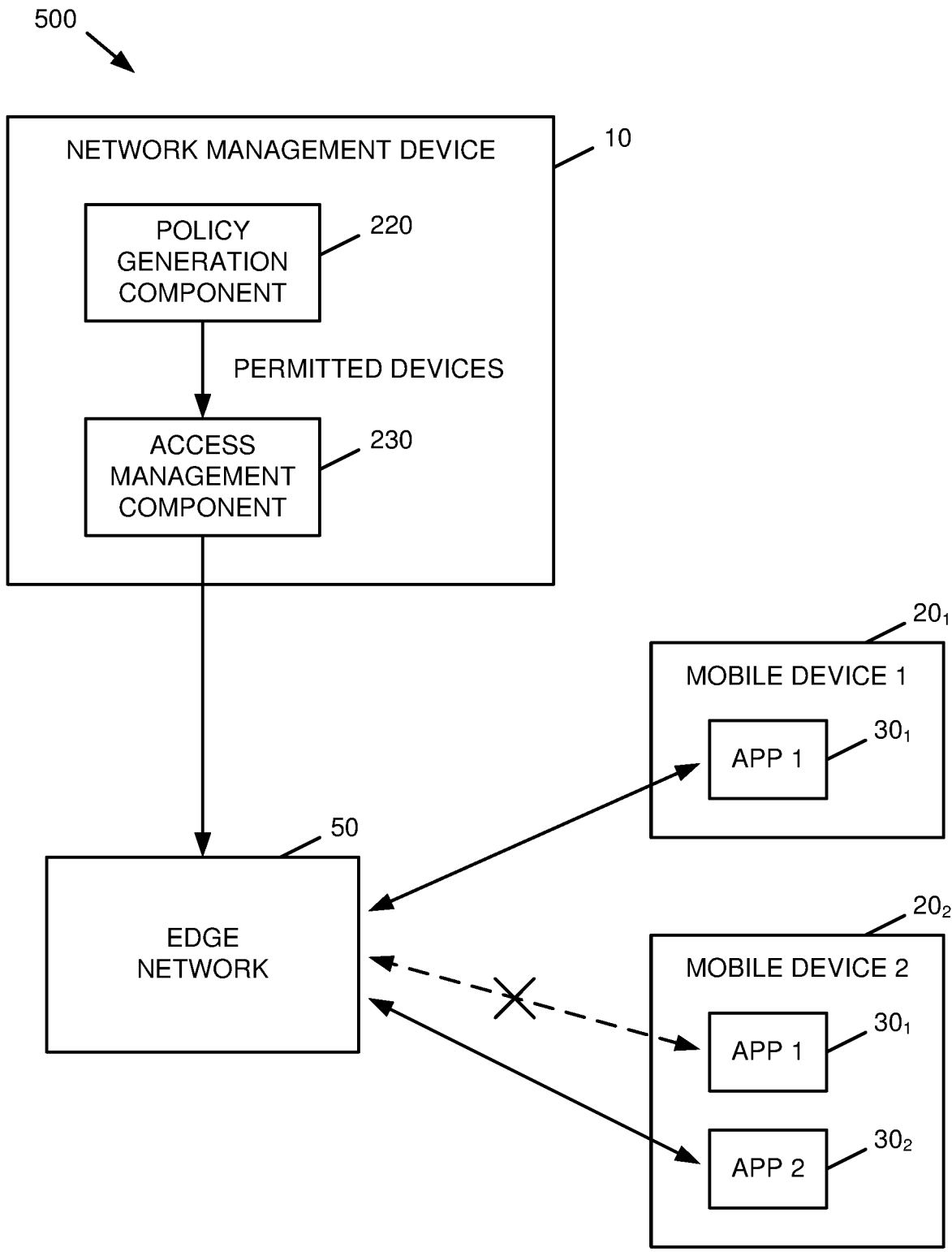
FIG. 5 is a block diagram of a system that facilitates managing network access by a mobile application based on a group of permitted devices in accordance with various aspects described herein.

In an additional example as shown by system 500 in FIG. 5, the policy generation component 220 can define a set of permitted mobile devices 20 for one or more mobile applications 30. Upon identifying that an applicable mobile application 30 is running on a mobile device 20, the access management component 230 can then selectively grant access to resources of the edge network 50 the mobile application 30 on the mobile device 20 if the mobile device 20 is one of the set of permitted devices or deny access to those resources to the mobile application 30 otherwise. For instance, as shown by FIG. 5, a mobile application $30_1$ running on first mobile device $20_1$ that is in a set of permitted devices can be given access to resources of an edge network 50, which the same mobile application $30_1$ running on a second mobile device $20_2$ that is not in the set of permitted devices can be denied access to the resources of the edge network 50. As further shown by FIG. 5, network access restrictions can be applied on a per-application level such that a second mobile application $30_2$ running on the second mobile device $20_2$ can be given access to the resources of the edge network 50 even when access to the same resources was denied for other applications on the same device.

In an aspect, the access management component 230 can determine whether a given mobile device 20 is one of a set of permitted or otherwise authorized mobile devices based on user credentials associated with the mobile device 20. For instance, a mobile device 20 can be associated with multiple user profiles, and the access management component 230 can determine whether the mobile device 20 is permitted access to edge network resources based on a currently active user profile. In some cases, whether a mobile device 20 is a permitted device for purposes of accessing one or more mobile applications 30 can be determined at least in part by the mobile device 20 itself, e.g., according to parental controls or other restrictions placed on respective user profiles associated with the mobile device 20. In another example, the access management component 230 can compare user credentials associated with a mobile device 20 to one or more permitted user classes for a given mobile application 30 to determine if the mobile device 20 is a permitted device. For instance, students on school grounds can be denied network access to one or more mobile applications 30 while still allowing access to those mobile applications 30 by other mobile users on the school grounds.

As another example, access to mobile applications 30 associated with public utilities, building maintenance, or other similar activities can be restricted to only authorized personnel.

Figure 6:
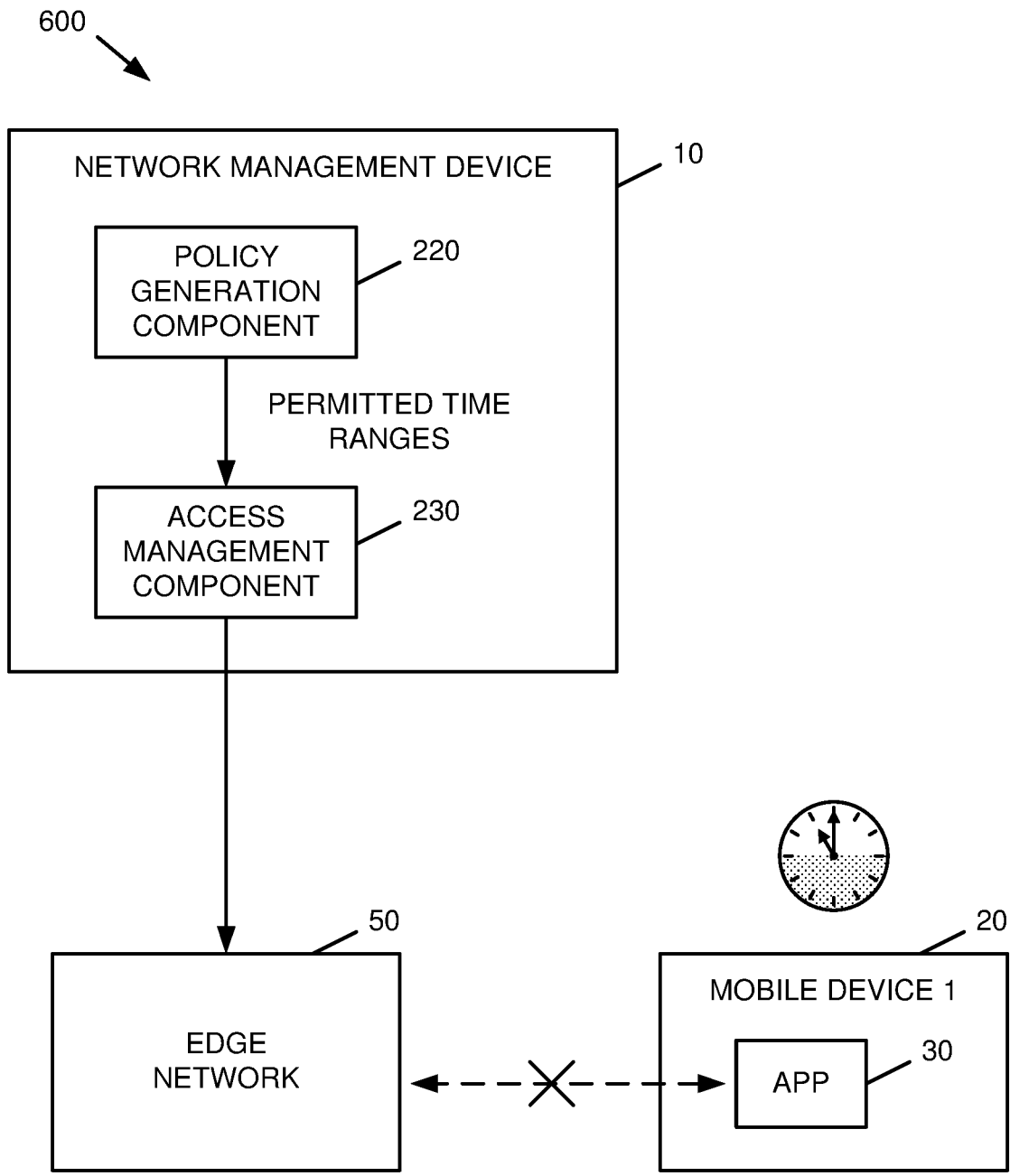
FIGS. 6-7 are respective block diagrams of a system that facilitates managing network access by a mobile application based on permitted time ranges in accordance with various aspects described herein.
Figure 7:
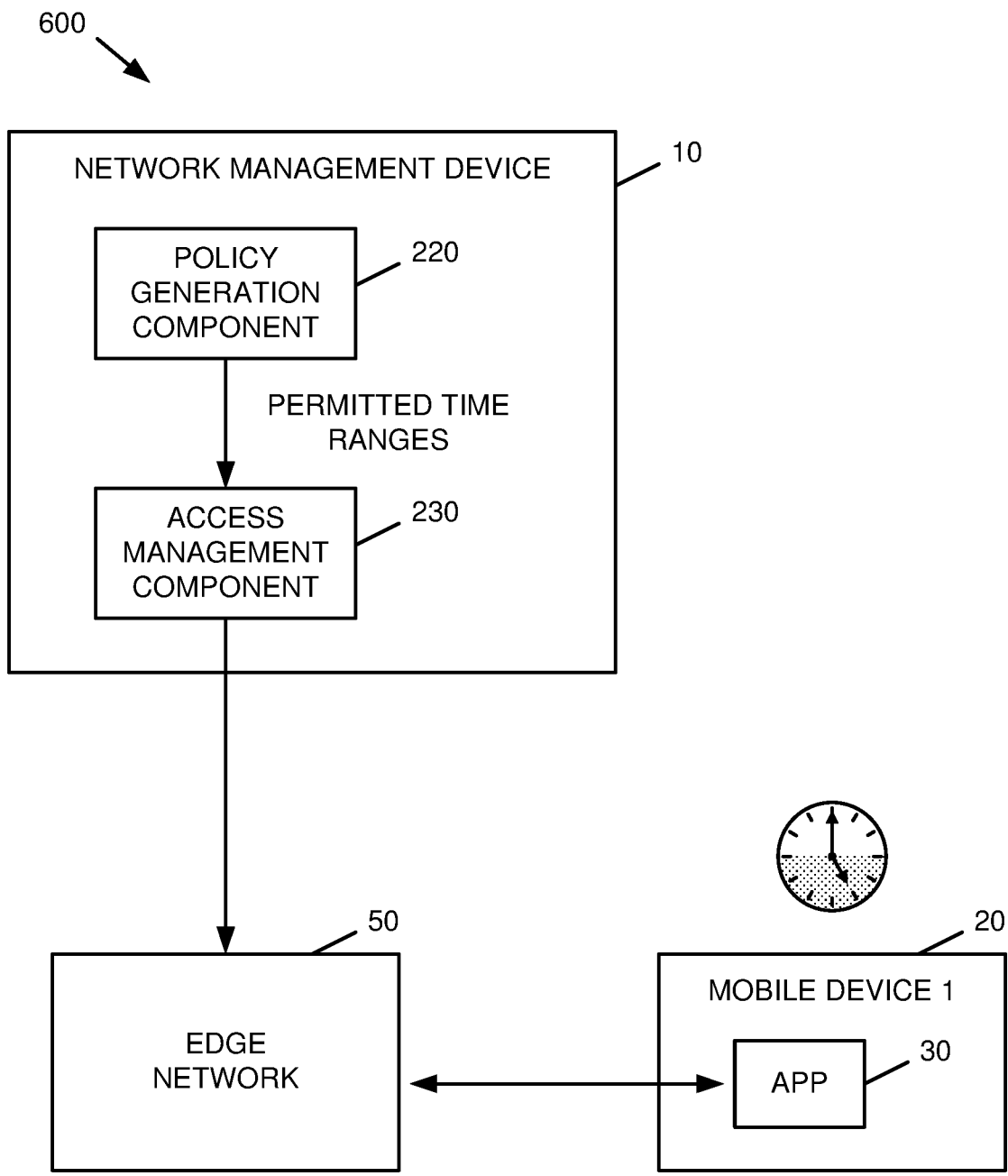

As a further example illustrated by system 600 in FIGS. 6-7, the policy generation component 220 can identify permitted time ranges for a mobile application 30 such that the access management component 230 can regulate access to the mobile application 30 based on the permitted time ranges. For instance, as shown in FIG. 6, the access management component 230 can deny access to resources of an edge network 50 to a mobile application 30 (e.g., as running on a mobile device 20) at times that fall outside of the permitted time range. Conversely, as shown by FIG. 7, the access management component 230 can instead grant access to the resources of the edge network 50 to the mobile application 30 at other times that fall within the permitted time range.

In an aspect, a time-based authorization policy as shown by FIGS. 6-7 can be employed to facilitate scheduled and/or sanctioned AR experiences and/or other mobile applications 30. For example, an AR experience corresponding to a museum tour can be configured such that it can be accessed only during scheduled tour times. In another example, a time-based authorization policy can be combined with one or more other policies as described above to facilitate improved levels of access control. For instance, access restrictions as applied to students on school property as described above can be given time ranges such that, e.g., students are denied access to certain mobile applications 30 on school property during school hours but are allowed access at other times. Also or alternatively, parental controls as described above can be configured with curfews and/or other time ranges such that access to certain mobile applications 30 for restricted user profiles is allowed only during permitted time ranges. Other implementations are also possible.

Figure 8:
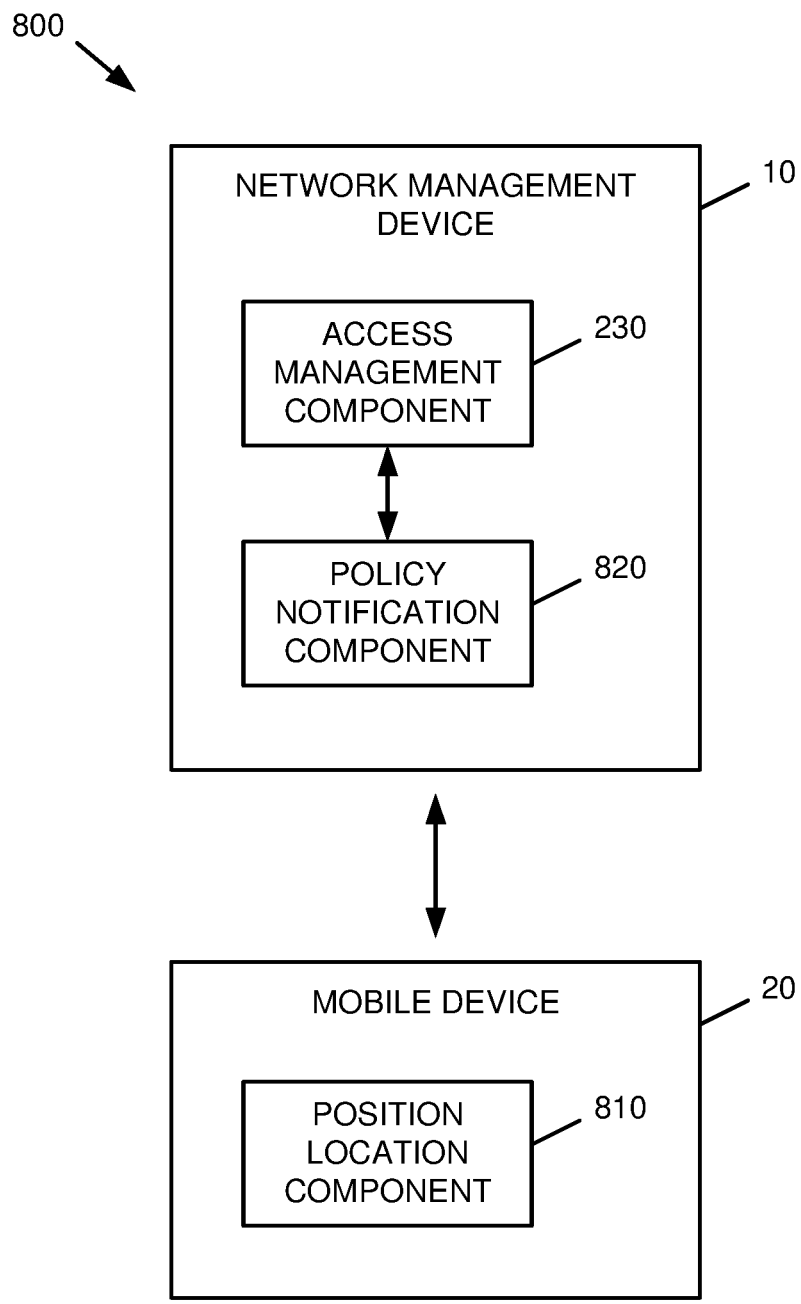
FIG. 8 is a system that facilitates notification of relevant authorization policies based on mobile device position in accordance with various aspects described herein.

Referring next to FIG. 8, a system 800 that facilitates notification of relevant authorization policies based on mobile device position in accordance with various aspects described herein is illustrated. Repetitive description of like elements employed in other embodiments described herein is omitted for sake of brevity. In an aspect, system 800 includes a network management device 10 and a mobile device 20, which can operate in accordance with various aspects as described above. More particularly, the network management device 10 can regulate access by the mobile device 20 to resources of a communication network, such as an edge network 50 (not shown in FIG. 8) according to an authorization policy as described above.

In an aspect, upon the mobile device 20 powering on and/or otherwise becoming available for communication, the mobile device 20 can connect to and register with one or more associated communication networks. Additional procedures, such as network authentication, device mediation and/or adaptation in order to normalize platform interactions, or the like, can also occur during connection of the mobile device 20 to respective communication networks.

Next, an initial location of the mobile device 20 can be provided to the network management device 10 via a position location component 810 at the mobile device 20. The position location component 810 can utilize any suitable positioning technique(s), such as Global Positioning System (GPS) and/or Assisted GPS (AGPS) positioning, terrestrial positioning, or the like, to determine the present position of the mobile device 20. Also or alternatively, the position location component 810 can assist an associated network in determining the position of the mobile device (e.g., by cell site triangulation, based on Wi-Fi Media Access Control (MAC) information, etc.). As still another alternative, the position location component 810 can determine the position of the mobile device 20 with the assistance of beacons or via onboard photogrammetry. Other techniques could also be used.

Based on the position of the mobile device 20, the network management device 10 can adapt the device position to a physical space representation of its location within a three-dimensional point cloud map (3DPCM) of an area in which the mobile device 20 is located. In an aspect, the 3DPCM can correspond to one or more physical spaces as described above. The mobile device 20 can be localized by the network management device 10 against 3D models and/or maps of the physical space in which it is located in order to determine a runtime policy that can determine the authorized cyber-centric experiences for a user of the mobile device 20 at its present place and time. As described above, such a policy can be maintained and/or enforced by an access management component 230 at the network management device 10.

Next, the network management device 10, via a policy notification component 820, can provide the mobile device 20 with information indicating currently permitted uses at the location of the mobile device and/or adjacent locations. In an aspect, the permitted uses can be set in relation to the 3DPCM for the area by a control system associated with the area, e.g., as described with respect to FIG. 3. In a further aspect, permitted uses associated with a runtime policy can be defined with respect to the 3DPCM in advance. For instance, an area can have a default state in which no restrictions are enforced, and this default state can be overridden by defining permitted uses with respect to the 3DPCM of the area.

Upon the mobile device 20 receiving the information relating to the permitted uses at its location, the mobile device 20 can utilize one or more applications or other device features according to the runtime policy. In an aspect, a physical space in which the mobile device 20 is located can utilize a networked venue service and/or venue gate to regulate access to network resources at the physical space. For instance, a user of the mobile device 20, upon accessing a network at the physical space, can be presented with a list of experiences that can be utilized by the mobile device 20 in its environment via the venue gate based on the corresponding runtime policy. In some cases, the venue gate can also condition access to network resources and/or respective experiences using said resources on various conditions, such as acceptance of terms of use, payment of an access fee, or on other conditions.

In an aspect, the mobile device 20 can update its position within a given physical space via the position location component 810 at respective intervals. These update intervals can be based on an amount of movement of the mobile device 20; e.g., the mobile device 20 can in some cases update its position more frequently while moving and less frequently while static. As the position of a mobile device 20 is updated, the network management device 10 can update the runtime policy for the mobile device 20 based on its updated location.

Figure 9:
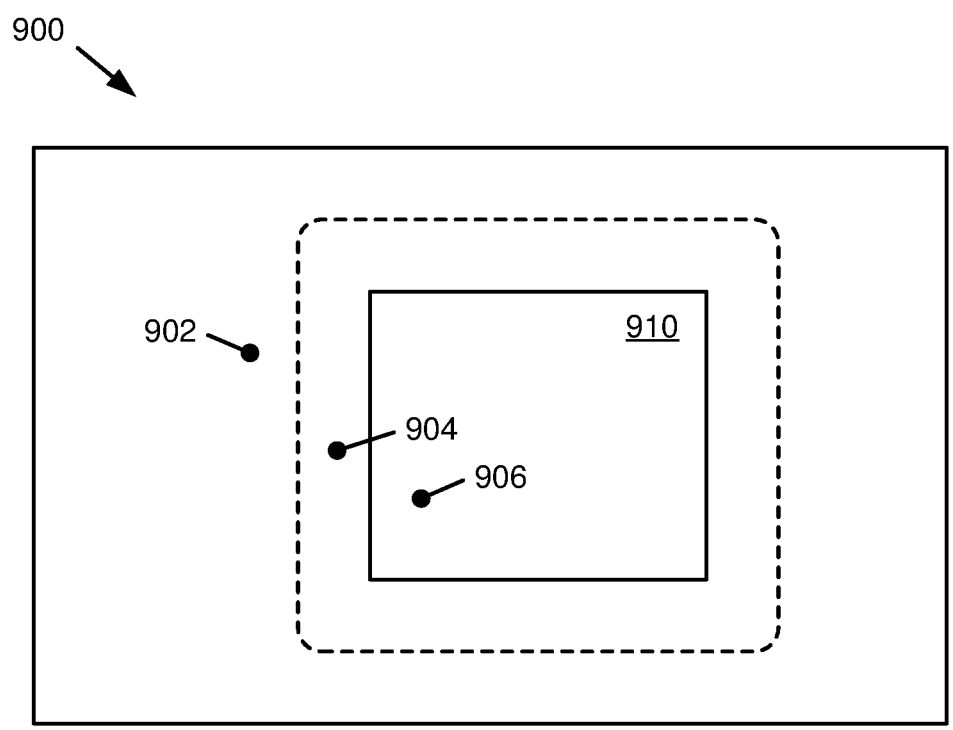
FIG. 9 depicts example operating areas for a mobile application that can be provisioned in accordance with various aspects described herein.

As a mobile device 20 moves, its position and/or orientation can be used to support adjacency determination and any impacts across or between spaces controlled by different policies. In an aspect, a policy notification component 820 at the network management device 10 can alert the mobile device 20 when it approaches the boundary of a physical space that has policies that may impact the operation of the mobile device 20. By way of example, diagram 900 in FIG. 9 illustrates an area in and around a physical space 910 that is subject to an authorization policy as described herein. While a mobile device 20 is outside the physical space 910, e.g., at location 902, the authorization policy corresponding to the physical space 910 does not affect applications running on the mobile device 20.

In response to the mobile device 20 coming within a predetermined region surrounding the physical space 910, e.g., at location 904 within the region indicated by a dashed line in diagram 900, the policy notification component 820 can take one or more actions to inform a user of the mobile device 20 that they are approaching an area subject to an authorization policy. In an aspect, the policy notification component 820 can provide a notification directly or indirectly, e.g., via one or more applications that are subject to the authorization policy. A notification as provided in this manner can include blocking or obfuscating the physical space in the application (e.g., in the case of an AR application or the like), displaying a warning on the mobile device 20 that it is entering an area in which currently running applications may not function, etc.

In an aspect, the area in which notifications corresponding to a physical space 910 are issued can be set by the underlying communication network and/or set on a per-space basis by a control system for the physical space 910. Further, the notification area can be set based on a radius or other distance from the physical space 910, such that the policy notification component 820 can facilitate notifying a mobile device 20 of an authorization policy corresponding to the physical space 910 in response to the mobile device 20 moving to within a threshold distance of the physical space 910. Alternatively, the notification area can itself be a defined physical space with its own defined boundaries such that notifications are triggered upon entry of a mobile device 20 into the notification area. Other techniques are also possible.

As additionally shown by diagram 900, upon a mobile device 20 entering the physical space 910, e.g., at location 906, the policy notification component 820 can facilitate informing a user of the mobile device 20 that the authorization policy associated with the physical space 910 is in effect. This notification can be performed directly by the policy notification component 820 and/or indirectly, e.g., via one or more affected applications running at the mobile device 20. For instance, an application running on the mobile device 20 can respond with generic and/or usage-specific behaviors, such as displaying geofencing bars; displaying a "not authorized" virtual placard; limiting, redirecting, or ceasing operation; etc.

In another aspect, for areas which the network management device 10 determines are stale or under high levels of use or change, the network management device 10 can request information from capable devices (e.g., fixed light detection and ranging (LIDAR) or closed-circuit television (CCTV) units, delivery or service robots, in-use AR devices, UAVs, etc.) and utilize 3D sensor fusion and/or other techniques to update its information relating to said areas. In doing so, the network management device 10 can leverage map updates performed by respective devices in an area in their normal course of operation to keep mapping information stored by the network management device as accurate as possible.

In a further aspect, the network management device can also provide conflict avoidance capability that prevents various conflicts, e.g., physical-to-physical, cyber-to-physical, and/or cyber-to-cyber conflicts. For instance, the network management device 10 can provide guidance to respective applications operating in an area to better enable the applications to prevent physical collisions between users of the same application or different applications. As another example, the network management device 10 can provide information to respective applications to better enable the applications to apportion available network resources between each other.

In addition to the above, the network management device 10 can facilitate other improvements to network operation via the access management component 230 and/or associated authorization policies. For instance, the network management device 10 in some cases can provide beam steering information to a radio access network and/or free space optical components. Other advantages are also possible.

Figure 10:
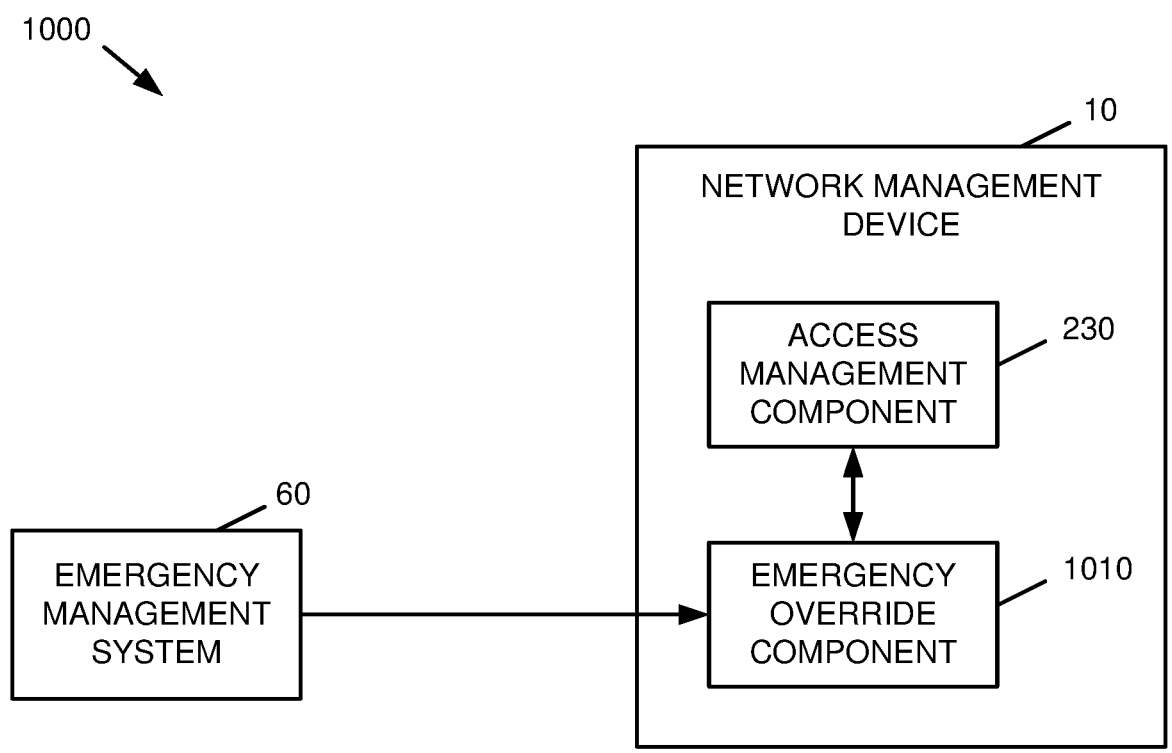
FIG. 10 is a block diagram of a system that facilitates integration of a network authorization policy with an emergency management system in accordance with various aspects described herein.

With reference next to FIG. 10, a block diagram of a system 1000 that facilitates integration of a network authorization policy with an emergency management system 60 in accordance with various aspects described herein is illustrated. Repetitive description of like elements employed in other embodiments described herein is omitted for sake of brevity. As shown by FIG. 10, the network management device 10 of system 1000 includes an emergency override component 1010 that can override and/or otherwise alter an authorization policy, e.g., as managed by the access management component 230, in response to identifying that an emergency (e.g., a fire, police activity, a medical emergency, a missing person, etc.) has occurred in the geographic area corresponding to the authorization policy.

In an aspect, an emergency as recognized by the emergency override component 1010 can be provided via a control system 40 as described above with respect to FIG. 3, e.g., by manually entering details of the emergency into the control system 40. Alternatively, as shown in system 1000, the emergency override component 1010 can be configured to receive emergency information from an automated emergency management system 60 such as the Emergency Alert System (EAS) or the like.

In another aspect, the emergency override component 1010 can alter an authorization policy corresponding to a physical space according to an override policy. By way of example, the emergency override component 1010 can cease on-site cyber activity, such as AR experiences, service robot operation, etc. In another example, the emergency override component 1010 can facilitate notifying respective affected devices of the existence and/or nature of the emergency and, if suitable, instructions to vacate the area. As a further example, the emergency override component 1010 can cause eligible controllable autonomous devices (e.g., delivery or service robots, UAVs, etc.) to provide video, LIDAR, and/or other forms of aid to support directed search efforts, e.g., in the event of an Amber Alert. Other actions could also be taken by the emergency override component 1010 as appropriate.

Figure 11:
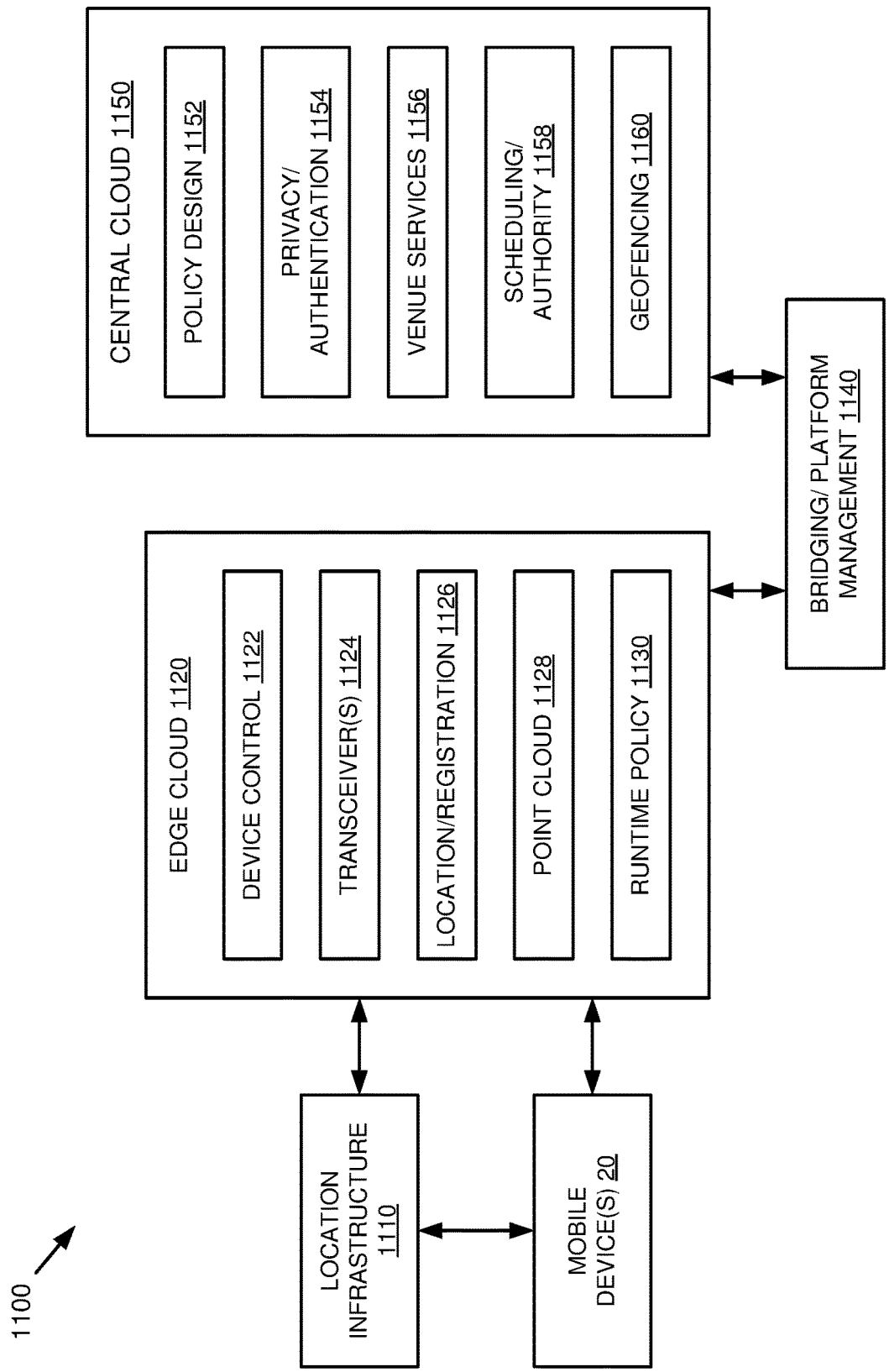
FIG. 11 is a diagram of an example network architecture in which various embodiments described herein can function.

Turning now to FIG. 11, a diagram 1100 of an example network architecture in which various embodiments described herein can function is illustrated. It should be appreciated that the network architecture shown by diagram 1100 is merely one example of a network architecture that could be employed and that other network architectures are possible. It should further be appreciated that respective functional blocks discussed with respect to diagram 1100 could be implemented by any suitable number of devices.

As shown by diagram 1100, a network architecture can be interacted with via one or more mobile devices 20. A mobile device 20 as described herein can be any suitable device that facilitates interaction with one or more mobile applications 30 and/or other suitable applications. For instance, a mobile device 20 can include, but may not be limited to, a smartphone, a virtual reality headset, a computing device, etc.

As additionally shown by diagram 1100, respective mobile devices 20 can interact with a location infrastructure 1110 to provide information to the network regarding positioning of said mobile devices 20. This location infrastructure 1110 can include, e.g., network transmitters that provide triangulation functionality, cameras, wireless beacons or tags, and/or any other suitable devices.

The mobile devices 20 and location infrastructure 1110 as shown by diagram 1100 can further interact with an edge cloud (edge network) 1120, which provides low-latency functionality for one or more applications as generally described above. The edge cloud 1120 can include a device control block 1122 that can adapt a given application to available network and/or device resources, determine a division of processing between the edge cloud platform and individual devices, and/or perform other appropriate actions.

The edge cloud 1120 further includes one or more transceivers 1124, which can include Evolved Node Bs (eNBs), remote radio heads (RRHs), baseband units (BBUs), WiFi access points, and/or other devices that provide communication functionality between the edge cloud 1120 and the mobile devices 20.

The edge cloud 1120 shown in diagram 1100 can further include a location/registration block 1126, which can determine the positions of respective mobile devices 20 (e.g., via a position location component 810 as described above with respect to FIG. 8) with reference to a point cloud 1128. This positioning can in turn be utilized to facilitate orientation and/or visual registration of respective synthetic elements associated with a given AR application, facilitate operation of autonomous devices, and/or other suitable uses.

The edge cloud 1120 can additionally include a runtime policy 1130, which can regulate access to resources of the edge cloud 1120 by respective mobile devices 20 in a given area. For instance, the runtime policy 1130 can be and/or include an authorization policy as managed by an access management component 230 in accordance with various aspects as described above. While the runtime policy 1130 is illustrated in diagram 1100 as a separate component from the device control block 1122, the runtime policy 1130 can in some cases be implemented as part of the device control functionality of the edge cloud 1120.

As further shown in diagram 1100, the edge cloud 1120 can interact with a central cloud 1150 via a bridging/platform management system 1140. While the edge cloud 1120 can generally be located near the location of a given application to facilitate low-latency operation as described above, the central cloud 1150 can be a centralized network system that performs one or more high level operations with respect to an application that are not as time-sensitive as operations associated with the edge cloud 1120. In an aspect, the bridging/platform management system 1140 can facilitate communication between the edge cloud 1120 and the central cloud 1150 via the Internet and/or one or more other suitable communication or computing networks.

The central cloud 1150 shown in diagram 1100 includes a policy design block 1152, which can be utilized to onboard one or more software platforms used to create a given application (e.g., Unity, Java, etc.) and facilitate interaction between those software platforms and the network environment shown by diagram 1100. The policy design block 1052 can further control various aspects of how a given application performs, such as an application's area of operation, monetization, user eligibility, or the like.

The central cloud 1150 further includes a privacy/authentication block 1154 that can facilitate secure management of user data, e.g., in connection with user authorization as performed by the policy design block 1152. To these ends, the central cloud 1150 can additionally include a venue services block 1156 which can handle operations such as user registration, payment collection, and/or other suitable operations in association with cyber-centric activities occurring within a physical or virtual venue.

The central cloud 1150 can additionally include one or more blocks to regulate access to resources of the edge cloud 1120 and/or the central cloud 1150 in accordance with various aspects described herein. For instance, the central cloud 1150 shown in diagram 1100 includes a scheduling/authority block 1158 that can enforce access policies based on time schedules (e.g., as described above with respect to FIGS. 6-7), user and/or device credentials (e.g., as described above with respect to FIG. 8), and/or other criteria. The central cloud 1150 as shown in diagram 1100 can additionally include a geofencing block 1160 that can relate respective authorization policies as described herein to their corresponding physical areas.

Figure 12:
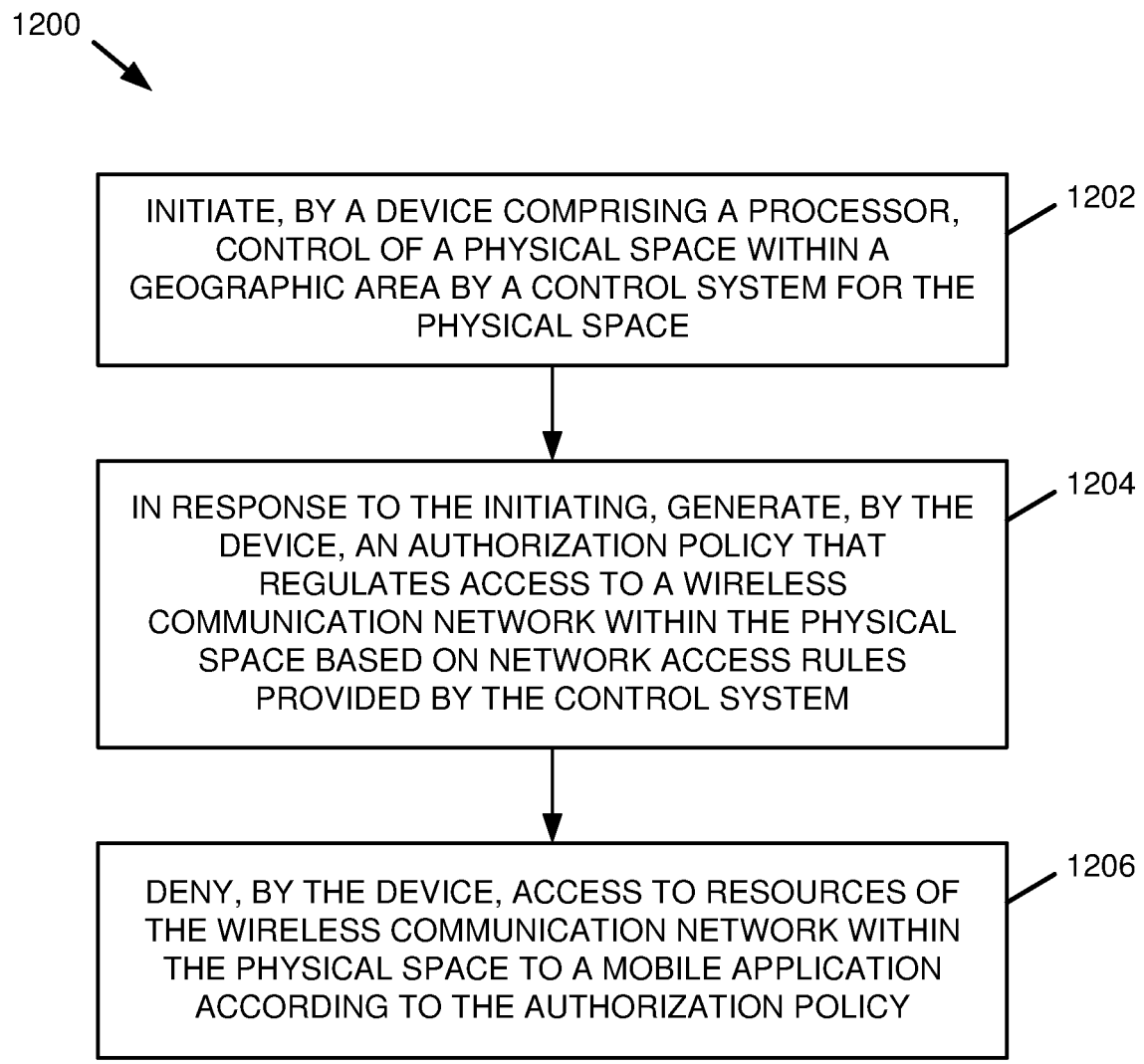
FIG. 12 is a flow diagram of a method that facilitates a cyber control plane for universal physical space in accordance with various aspects described herein.

FIG. 12 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 12, a flow diagram of a method 1200 that facilitates a cyber control plane for universal physical space is presented. At 1202, a device comprising a processor (e.g., a network management device 10 comprising a processor 14) can initiate (e.g., by a space definition component 210 and/or other components implemented by the processor 14) control of a physical space within a geographic area by a control system (e.g., a control system 40) for the physical space.

At 1204, the device can generate (e.g., by a policy generation component 220 and/or other components implemented by the processor 14) an authorization policy that regulates access to a wireless communication network within the physical space in response to control of the physical space being initiated at 1202. The authorization policy can be based on network access rules as provided by the control system.

At 1206, the device can deny (e.g., by an access management component 230 and/or other components implemented by the processor 14) access to resources of the wireless communication network within the physical space to a mobile application (e.g., a mobile application 30) according to the authorization policy generated at 1204.

Figure 13:
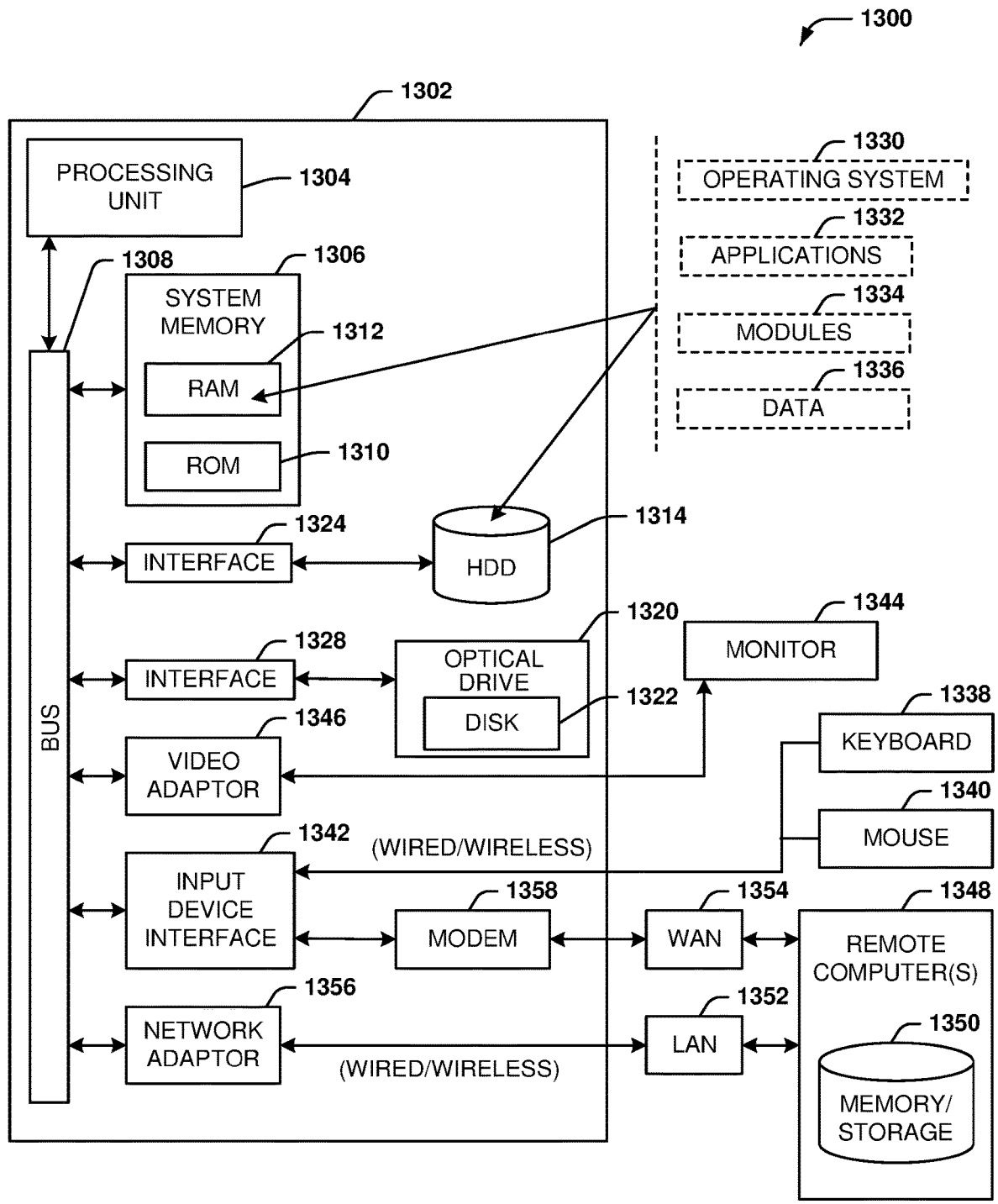
FIG. 13 depicts an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 and an optical disk drive 1320, (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314 and optical disk drive 1320 can be connected to the system bus 1308 by an HDD interface 1324 and an optical drive interface 1328, respectively. The HDD interface 1324 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a USB port, an IR interface, a BLUETOOTH® interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   defining, by a device comprising a processor, a physical space within a geographic area associated with a base station of a communication network, wherein the physical space occupies less than all of the geographic area associated with the base station;
   establishing, by the device, control of the physical space by a control system for the physical space;
   in response to the establishing, generating, by the device, an authorization policy that regulates access to network equipment comprising the base station via the communication network within the physical space based on network access rules provided by the control system;
   denying, by the device, access to resources enabled via the base station of the communication network to a mobile application as executing on a first mobile device positioned within the physical space according to the authorization policy; and
   granting, by the device, access to the resources enabled via the base station of the communication network to the mobile application as executing on a second mobile device positioned within the geographic area and outside of the physical space.

2. The method of claim 1, wherein the defining comprises:
   defining, by the device, the physical space within a three-dimensional point cloud of the geographic area.

3. The method of claim 1, wherein the authorization policy defines a group of permitted devices associated with the mobile application, and wherein the method further comprises:
   identifying, by the device, a third mobile device within the physical space on which the mobile application is executing, wherein the third mobile device is distinct from the first mobile device; and
   granting, by the device, access to the resources enabled via the communication network to the mobile application as executing on the third mobile device within the physical space in response to determining that the third mobile device is one of the group of permitted devices.

4. The method of claim 3, further comprising:
   determining, by the device, whether the third mobile device is the one of the group of permitted devices based on user credentials associated with the third mobile device.

5. The method of claim 1, wherein the authorization policy defines a permitted time range associated with the mobile application, wherein the method further comprises:
   granting, by the device, access to the resources enabled via the communication network to the mobile application as executing on a third mobile device positioned within the physical space at first times within the permitted time range, the third mobile device being distinct from the first mobile device; and
   denying, by the device, access to the resources enabled via the communication network to the mobile application as executing on the third mobile device positioned within the physical space at second times outside of the permitted time range.

6. The method of claim 1, wherein the mobile application is of an application type selected from a group comprising an augmented reality application type and a service robot control application type.

7. The method of claim 1, further comprising:
   transmitting, by the device, a notification of the authorization policy to the second mobile device in response to the second mobile device moving to within a threshold distance of the physical space.

8. The method of claim 1, further comprising:
   overriding, by the device, the authorization policy in response to identifying an occurrence of an emergency in the geographic area.

9. The method of claim 1, wherein the resources enabled via the communication network comprise edge network resources provided by edge network equipment located in the geographic area.

10. The method of claim 2, further comprising:
    transmitting, by the device, point cloud information to respective mobile applications operating in the geographic area;
    receiving, by the device, respective local point clouds from the respective mobile applications based on the point cloud information; and
    constructing, by the device, the three-dimensional point cloud of the geographic area from the respective local point clouds.

11. The method of claim 7, wherein transmitting the notification comprises blocking display of a representation of the physical space within the mobile application.

12. A system, comprising:
    a processor; and
    a memory that stores executable instructions that, when executed by the processor, facilitate performance of operations, the operations comprising:
        defining a physical space within a geographic area associated with an access point of a communication network, wherein the physical space occupies less than all of the geographic area associated with the access point;
        initiating control of the physical space by a steward system for the physical space;
        in response to the initiating, defining an access control policy that regulates access to resources enabled via the access point of the communication network within the physical space based on network access rules provided by the steward system;

prohibiting access to the resources enabled via the access point of the communication network to a mobile application as running on a first mobile device within the physical space according to the access control policy; and granting access to the resources enabled via the access point of the communication network to the mobile application as running on a second mobile device within the geographic area and outside of the physical space.

13. The system of claim 12, wherein the operations further comprise:
defining the physical space within a three-dimensional point cloud of the geographic area; and
associating the physical space with the steward system in the three-dimensional point cloud.

14. The system of claim 12, wherein the access control policy defines a group of permitted devices associated with the mobile application, and wherein the operations further comprise:
identifying a third mobile device within the physical space on which the mobile application is running, wherein the third mobile device is distinct from the first mobile device; and
granting access to the resources enabled via the wireless communication network to the mobile application as running on the third mobile device within the physical space in response to determining that the third mobile device is one of the group of permitted devices.

15. The system of claim 12, wherein the access control policy defines a permitted timeframe for the mobile application, and wherein the operations further comprise:
granting access to the resources enabled via the communication network to the mobile application as running on a third mobile device within the physical space at first times within the permitted timeframe, the third mobile device being distinct from the first mobile device; and
denying access to the resources enabled via the communication network to the mobile application as executing on the third mobile device within the physical space at second times outside of the permitted timeframe.

16. The system of claim 12, wherein the operations further comprise:
notifying the second mobile device of the access control policy in response to the second mobile device moving to within a threshold distance of the physical space.

17. A non-transitory machine-readable medium, comprising executable instructions that, when executed by a processor, facilitate performance of operations, comprising:
defining a physical location within a geographic area associated with network equipment comprising a base station as a section of the geographic area comprising less than all of the geographic area associated with the base station;
facilitating establishment of control of the physical location by a controlling entity;
in response to the facilitating the establishment of control, defining a network access policy that regulates access to communication network resources enabled via the network equipment within the physical location based on rules provided by the controlling entity;
blocking access to the communication network resources enabled via the network equipment to a mobile application as running on a first mobile device positioned within the physical location according to the network access policy; and
granting access to the communication network resources enabled via the network equipment to the mobile application as running on a second mobile device positioned outside the physical location.

18. The non-transitory machine-readable medium of claim 17, wherein the operations further comprise:
defining the physical location within a three-dimensional point cloud of the geographic area; and
associating the physical location with the controlling entity in the three-dimensional point cloud.

19. The non-transitory machine-readable medium of claim 17, wherein the network access policy defines a group of permitted mobile devices associated with the mobile application, and wherein the operations further comprise:
identifying a third mobile device positioned within the physical location on which the mobile application is running, the third mobile device being distinct from the first mobile device; and
granting access to the communication network resources to the mobile application as running on the third mobile device within the physical location in response to determining that the third mobile device is one of the group of permitted mobile devices.

20. The non-transitory machine-readable medium of claim 17, wherein the network access policy defines a permitted timeframe for the mobile application, and wherein the operations further comprise:
granting access to the communication network resources to the mobile application as running on a third mobile device within the physical location at first times within the permitted timeframe, the third mobile device being distinct from the first mobile device; and
denying access to the communication network resources to the mobile application as running on the third mobile device within the physical location at second times outside of the permitted timeframe.

* * * * *